April 12, 1966 E. M. TURNER 3,246,245

COMBINED ANTENNA AND CONVERTER CIRCUIT

Filed June 5, 1961

2 Sheets-Sheet 1

INVENTOR.
EDWIN M. TURNER

BY Wade Koontz and S.A. Strickett

ATTORNEYS

COMBINED ANTENNA AND CONVERTER CIRCUIT

Filed June 5, 1961 2 Sheets-Sheet 2

INVENTOR.
EDWIN M. TURNER
BY
Wade Koontz and
S. A. Strickland
ATTORNEYS

United States Patent Office 3,246,245
Patented Apr. 12, 1966

3,246,245

COMBINED ANTENNA AND CONVERTER CIRCUIT

Edwin M. Turner, Dayton, Ohio, assignor to the United States of America as represented by the Secretary of the Air Force Filed June 5, 1961, Ser. No. 115,046
7 Claims. (Cl. 325—442)

The invention described herein may be manufactured and used by or for the United States Government for governmental purposes without payment to me of any royalty thereon.

The invention relates to an antennaverter and particularly to a hybrid circuit combining the functions of a broad band antenna, a mixer, a turner and a filter, capable of scanning through a broad band of frequencies with no moving parts.

The space requirements of antennas, mixers, tuners and intermediate frequency amplifiers are often undesirable and present difficulties because of the cable losses and the connectors.

The present hybrid circuit combines in one compact unit a broad band antenna, a mixer, a local oscillator and a tuned IF (intermediate frequency) output, the whole assembly capable of being scanned over the entire frequency range of the antenna.

In the construction according to the invention, a two-armed broad band antenna, preferably one of the equiangular spiral types in which two arms are wound on a conical support and are rotated through an angle of about 180° from the position of each other, has the arms constructed of a coaxial conductor. The arms are connected by a nonlinear element such as a crystal or tunnel diode mixer at the apex of the spiral, the inner conductor of one arm is fed from a local oscillator. The inner conductor of the other arm then constitutes the IF output of the circuit. The antenna can be scanned over a wide band by varying only the frequency of the local oscillator. All components of the incoming signal and the local oscillator, and those generated in the nonlinear mixer are reradiated or suppressed except the difference frequency between the incoming signal and the local frequency which is too low in frequency to be reradiated, and is thus fed to the IF output circuit.

As described, the circuits are principally for receiving, however, they may be extended to transmitting for restricted band-widths by the application of special circuits to protect the mixer from high power burnout.

It is accordingly an object of the invention to provide an improved compact antenna-mixer-filter circuit.

It is a further object of the invention to provide an improved antenna-mixer-filter circuit having a low noise-to-signal output ratio.

It is still another object of the invention to provide an antenna-mixer-filter circuit which will suppress or reradiate undesirable frequency components.

It is still another object of the invention to provide an antenna system which is scannable through its broad band range by varying only the local oscillator frequency.

It is still a further object of the invention to provide an antenna-mixer-filter circuit of extreme compactness and light weight having frequency scanning with no moving parts.

Other objects and advantages of the invention will be apparent from the following detailed description taken in conjunction with the accompanying drawings in which.

Figure 1:
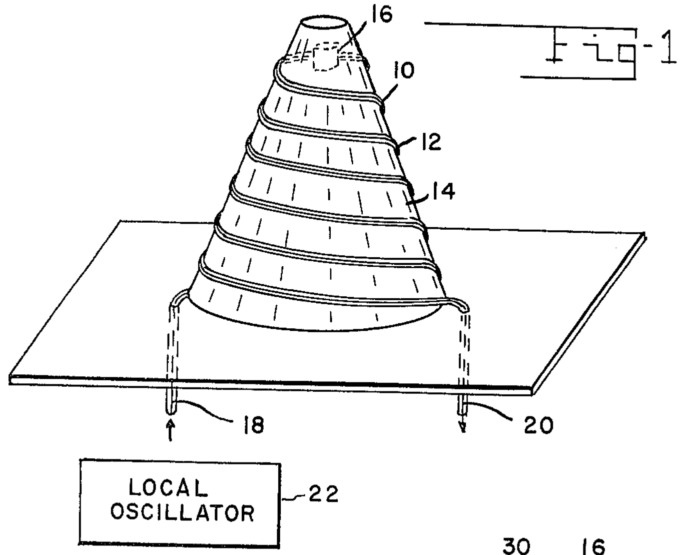
FIG. 1 is a perspective view of a spiral antenna according to the invention.

In the construction according to the invention, an antenna comprises two arms 10 and 12 spirally wound on an insulating cone 14 in substantially 180° opposition to provide the well known equiangular spiral antenna. The tips of the arms 10 and 12 are connected together by a mixer 16 which may be of any nonlinear type such as a crystal mixer or a tunnel diode. The arms 10 and 12 are constructed of portions of coaxial conductor with the exterior conductors forming the antenna proper and the interior conductor 18 of one arm, such as the arm 10, forming a connection for a local oscillator circuit to provide a local exciting frequency to the system. The inner conductor 20 of the other arm 12 then provides an intermediate frequency output connection for the device.

Figure 2:
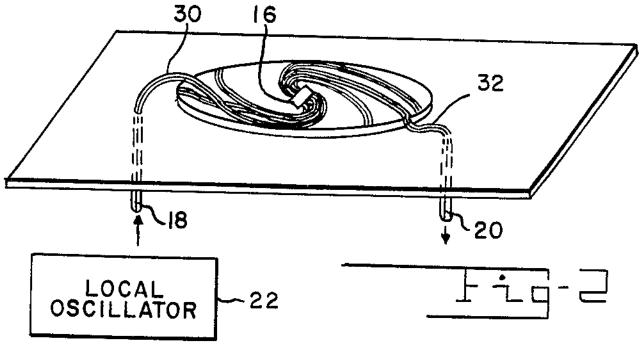
FIG. 2 is a modified equiangular spiral in planar position.

In the modification, according to FIG. 2, an equiangular spiral, is constructed of two arms 30 and 32 arranged in a planar formation having the same inner conductor 18 connected to the local oscillator 22 and the inner conductor 20 connected to the intermediate frequency utilizing circuit.

Figure 3:
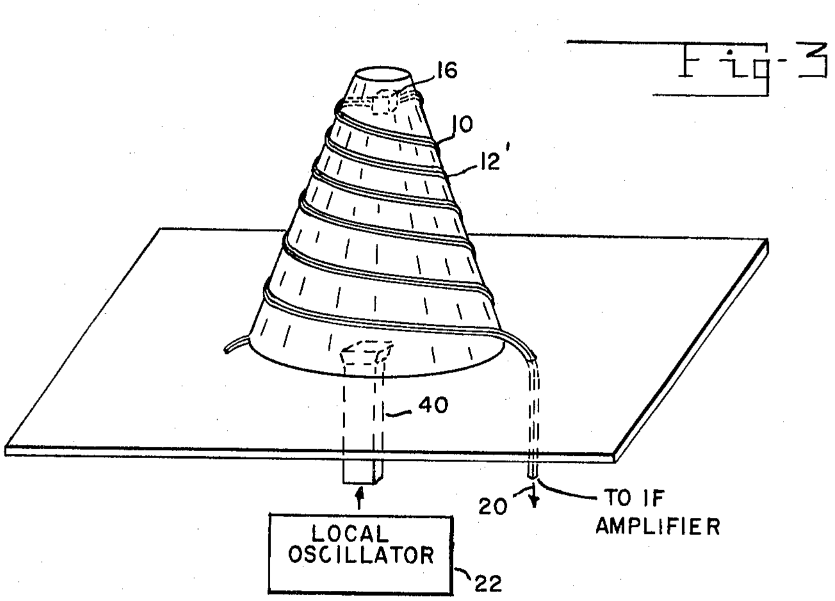
FIG. 3 is a further modification showing the utilization of a waveguide to provide local excitation to the antenna-mixer system.

In the construction according to FIG. 3, an equiangular spiral antenna is radiated with the local frequency by means of a waveguide 40 in which the arm 12' may not necessarily have an inner conductor.

Figure 4:
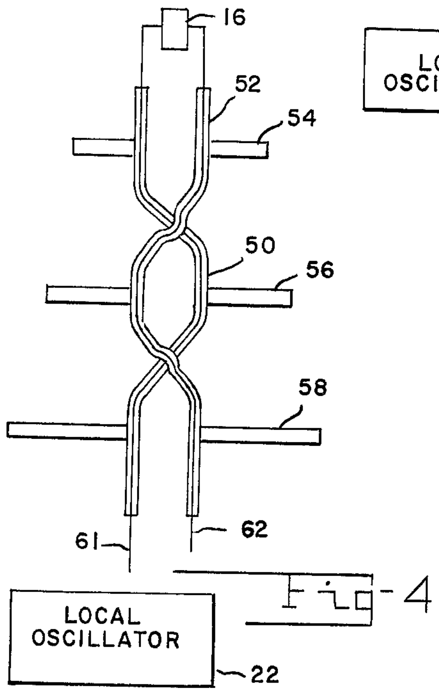
FIG. 4 is a similar view showing the application of the system to a logarithmic periodic antenna.

In the construction according to FIG. 4 a broad band antenna of the logarithmic periodic type is connected according to the present invention. A pair of antenna arms 50 and 52 are constructed of coaxial conductor and have connected thereto in order of relation the dipoles 54, 56 and 58. The inner conductor 61 of the arm 50 is connected to the local oscillator 22 and the inner conductor 62 is adapted to be connected to an intermediate frequency utilizing circuit. The apexes of the arms 50 and 52 are connected together by a mixer 16.

Figure 5:
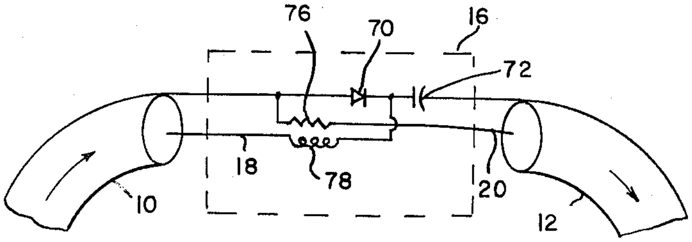
FIG. 5 is a detailed showing of the mixer connected at the apex of the antenna arms.

The details of a preferred type of mixer are disclosed in FIG. 5 in which a crystal nonlinear diode 70 is connected between the arms 10 and 12 with a capacitor 72 connected between the mixer and the arm 12. Inner conductor 20 is connected across the crystal 70 by means of an impedance 76, while the inner conductor 18 carrying the local oscillator frequency is connected across the mixer by means of a choke 78.

In the operation of the construction according to the invention, the local oscillating frequency is applied to the conductor 18 of the arm 10, then the output conductor 20 of the arm 12 is connected to the intermediate frequency utilizing circuit. In this construction, the incoming frequency, together with the local frequency and frequencies generated in the antenna, are reradiated except the difference frequency between the local frequency and the signal frequency. This intermediate frequency is directly fed out through the connection 20 and because of the reradiated filter action almost all noise is eliminated providing an intermediate frequency with a very low noise signal ratio. The antenna may be rapidly scanned over the entire band by a mere change of the local oscillator frequency.

For purposes of exemplification, particular embodiments have been shown and described according to the best present understanding thereof, however, it will be apparent to those skilled in the art, that many changes and modifications can be made therein without departing from the true spirit and scope of the invention.

I claim:

1. A combined antenna and converter circuit comprising: an antenna including a pair of equiangular spiral arms, each of said arms consisting of a section of coaxial cable, a crystal mixer connected between the two arms at the apex of the spiral, and means whereby the inner conductor of one of one of said arms constitutes the intermediate frequency output and the inner conductor of the other arm constitutes an input for connection to a local oscillator.

2. A combined antenna and converter circuit comprising: a conical spiral antenna including a pair of arms, at least one of said arms being a section of coaxial conductor, intermediate frequency output means coupled to the inner conductor of said coaxial conductor, a nonlinear mixer connected between the ends of said arms, and means to apply local oscillations to said antenna.

3. A combined antenna and converter circuit comprising: a two arm equiangular spiral antenna, each of said arms consisting of coaxial conductor, a nonlinear mixer connected between the outer ends of said arms, and means whereby the inner conductor of one of said arms constitutes the intermediate frequency output and the inner conductor of the other of said arms constitutes a local oscillator frequency input.

4. A broadband antenna comprising two conducting elements each having inner and outer electrically conductive leads separated by insulation, said elements being wound spirally in approximately 180° opposition to define a conical space enclosed by the turns of the spiral, said elements each having one end terminating adjacent the apex of the conical space, a heterodyne frequency mixer interconnecting said one end of said elements, and means for coupling said mixer to a local oscillator source whereby as electromagnetic energy bombards the antenna a beat frequency signal is produced in a preselected one of said elements.

5. A broadband antenna according to claim 1 wherein the means for coupling the mixer to the local oscillator source is a waveguide disposed to parasitically excite the mixer.

6. A broadband antenna comprising two conducting elements each having inner and outer electrically conductive leads separated by insulation, said elements being spirally wound in 180° opposition to define a conical space enclosed by the turns of the spiral, said elements extending between the apex and the base of the conical space, local oscillator means connected to the inner lead of one of said elements at a point adjacent the base region of the space for producing a variable frequency signal, and a beat frequency mixer interconnecting the ends of said elements near the apex of the space whereby as electromagnetic energy bombards the antenna a beat frequency signal is impressed on the inner lead of the other of said elements.

7. A unified antenna-receiver assembly comprising two conducting elements each having inner and outer electrically conductive leads separated by insulation, a substantially conical support member of electrically insulating material, said elements being spirally wound in 180° opposition on said support member and extending from the apex to the base thereof, a local oscillator having a connection to the inner lead of one of said elements for passing a signal of given frequency along the length of said element, and a mixer interiorly disposed of the support member connected between the ends of said elements which are proximate to the apex of the support member and acting to produce a beat frequency signal in the inner lead of the other of said elements in response to incident electromagnetic energy.

References Cited by the Examiner

UNITED STATES PATENTS

| | | | |
|---|---|---|---|
| 2,567,208 | 9/1951 | Horvath | 250—20 |
| 2,586,895 | 2/1952 | Willoughby | 250—20 |
| 2,832,885 | 4/1958 | Brett | 250—20 |
| 2,964,748 | 12/1960 | Radford | 343—908 |

ROBERT H. ROSE, *Primary Examiner.*

ROY LAKE, DAVID G. REDINBAUGH, *Examiners.*

E. C. MULCAHY, Jr., R. F. ROTELLA, R. S. BELL, *Assistant Examiners.*